(12) United States Patent
Fukuchi

(10) Patent No.: US 7,086,850 B2
(45) Date of Patent: Aug. 8, 2006

(54) SYSTEM AND METHOD FOR MOLDING PLASTIC GEAR SUPPRESSING SHRINKAGE

(75) Inventor: Yutaka Fukuchi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 428 days.

(21) Appl. No.: 10/430,208

(22) Filed: May 7, 2003

(65) Prior Publication Data

US 2003/0194466 A1    Oct. 16, 2003

Related U.S. Application Data

(60) Division of application No. 09/725,063, filed on Nov. 29, 2000, now Pat. No. 6,576,177, which is a continuation-in-part of application No. 09/221,877, filed on Dec. 29, 1998, now Pat. No. 6,181,899.

(30) Foreign Application Priority Data

Dec. 29, 1997   (JP)   .................................. 9-368853

(51) Int. Cl.
*B29C 39/36* (2006.01)
*B29C 45/40* (2006.01)
(52) U.S. Cl. ........................ 425/444; 425/175; 425/554
(58) Field of Classification Search ................ 264/219, 264/328.7, 334; 425/436 R, 444, 175, 554, 425/577
See application file for complete search history.

(56) References Cited

U.S. PATENT DOCUMENTS

| 4,050,283 A | 9/1977 | Schober |
| 4,223,125 A | 9/1980 | Bier et al. |
| 4,603,831 A * | 8/1986 | Krishnakumar et al. .... 249/144 |
| 5,595,090 A | 1/1997 | Moribayashi |
| 6,000,295 A | 12/1999 | Kimizuka |
| 6,181,899 B1 | 1/2001 | Fukuchi |

FOREIGN PATENT DOCUMENTS

| JP | 8-6437 | 1/1996 |
| JP | 9-230657 | 9/1997 |

* cited by examiner

*Primary Examiner*—Allan R. Kuhns
(74) *Attorney, Agent, or Firm*—Oblon, Spivak, McClelland, Maier & Neustadt, P.C.

(57) ABSTRACT

A gear molding method for molding a plurality of plastic gears having a different number of ribs without changing costly gates uses a mold having a prescribed gear shape including a prescribed number of grooves substantially radially arranged in the mold. A prescribed number of gates is provided for pouring molten plastic into the mold. When a plastic gear is molded and separated from the mold, a prescribed number of grooves are additionally cut at a middle angular position between each of the pair of neighboring grooves without changing the gates. Then, another gear having increased number of ribs is molded using the same gates.

1 Claim, 19 Drawing Sheets

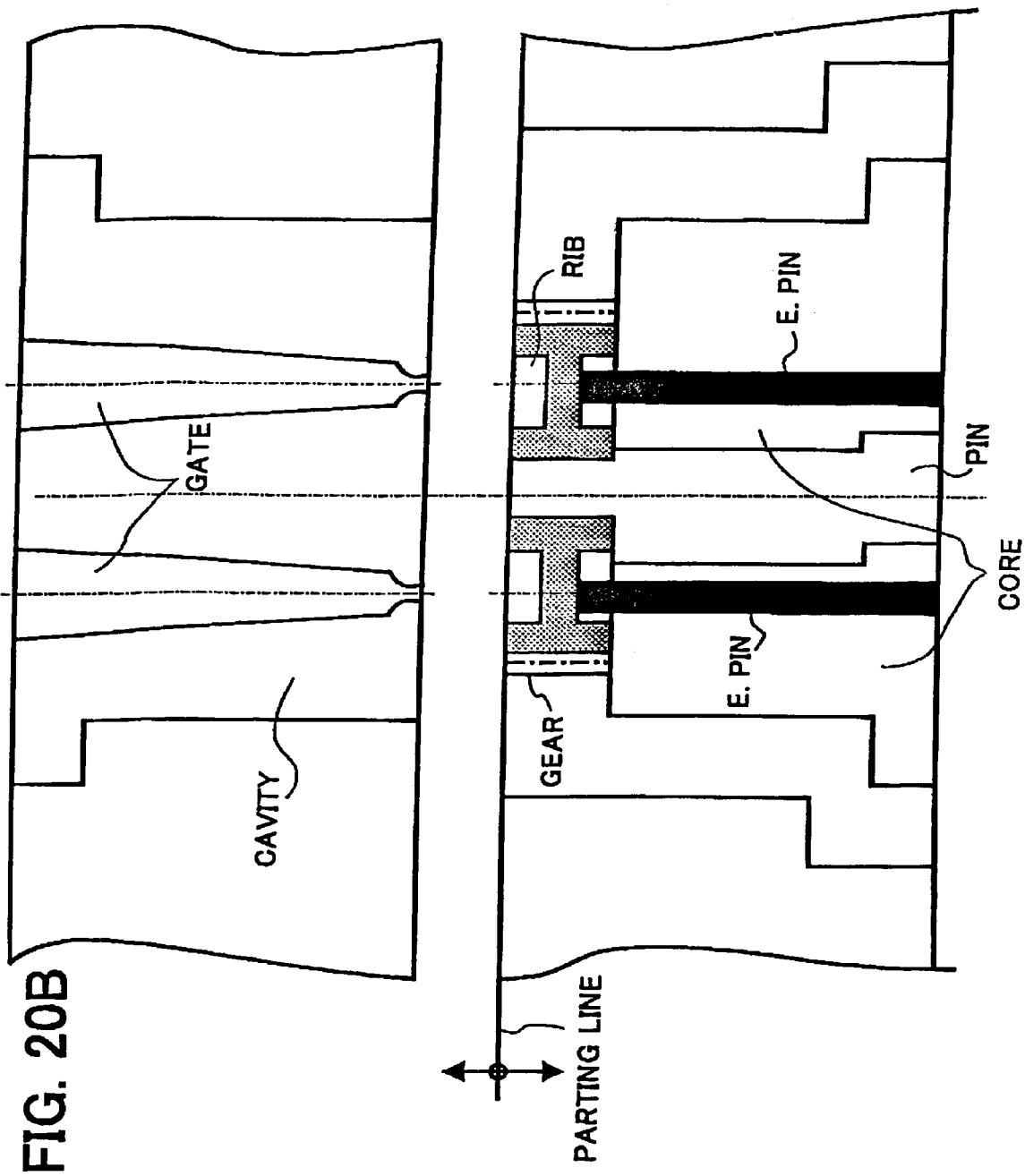

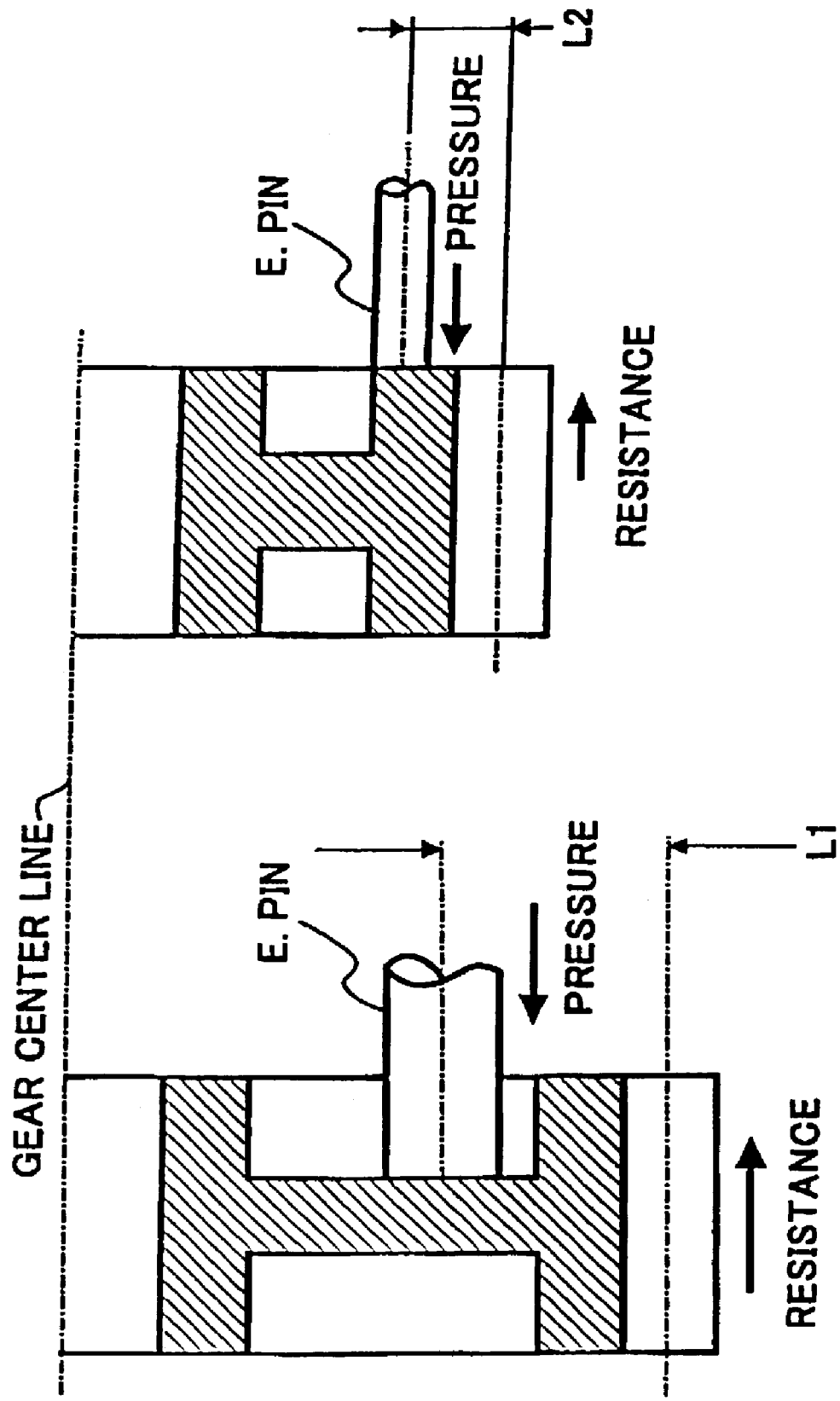

EJECTING PIN-
CONTACT PORTION

FAT SECTION

EJECTING PIN-
CONTACT PORTION

SYSTEM AND METHOD FOR MOLDING PLASTIC GEAR SUPPRESSING SHRINKAGE

BACKGROUND OF THE INVENTION

1. Field of the Invention

This invention relates to a plastic gear molding system and method, in particular relates to a plastic gear molding system and method capable of preventing from partial shrinkage during its molding process.

2. Discussion of the Background

It is well known in a transmission apparatus to have at least one plastic gear that transmits a rotation force of a driving motor to a driven member. For example, in an image forming apparatus such as a copier, a printer, a facsimile and a multi-functioned machine having a plurality of functions, a rotation force of a driving motor is generally transmitted to an image carrier through a driven member contacting the surface of the image carrier or the like for forming a toner image on the surface of the image carrier during its rotation. The conventional plastic gear may also be used in a duplicator, a camera, a video deck and a compact disk player and so on to transmit a rotational force to a driven member thereof.

In recent years, such plastic gears have tended to be rotated at relatively high speeds and so have been subjected to higher external forces. Since the conventional plastic gear is simply constituted by a hub, a gear ring and a web whose ends connect the hub and the gear ring, it has been difficult to meet the necessary level of rigidity and strength required for the plastic gear. It is of course possible to increase both the rigidity and the strength to meet the prescribed level if both a thickness and a size of the background gear are increased.

However, this is costly and a transmission apparatus unavoidably becomes bulky. To increase the rigidity, a plurality of ribs may be symmetrically integrally mounted on both front and rear surfaces of the web in a manner such that each one edge connects with the hub and each another edge connects to the gear ring. However, a diameter of such a plastic gear generally varies during its molding process due to the so called a shrink phenomenon of the plastic. As a result, a peripheral speed of the plastic gear periodically changes when it rotates, and accordingly unevenness of the rotational speed of the driven member may arise.

The present inventors have determined that the shrink phenomenon occurs for the reason hereinbelow explained in detail referring to FIGS. 10 through 12. A background plastic gear 14 includes a cylindrical hub 25 disposed as a core portion thereof and is supported by the shaft 15 illustrated in FIG. 2. The plastic gear 14 further includes a gear ring 27 having substantially concentric with the hub 24 and having a larger diameter than the hub 24, which is disposed at of the hub 25.

The gear ring 27 includes a plurality of gear teeth 26 on an outer circumferential surface thereof. The plastic gear 14 further includes a web 28 constituted by a circular plate whose ends integrally connect the hub 24 and the gear ring 27. A plurality of ribs 28A and 28B are each integrally formed respectively on front and rear sides of the web 28. Each of the plurality of groups of the ribs extends in a radial state from the hub 24 to the gear ring 27.

The ribs 29A formed on a front surface of the web 28 are arranged at a prescribed angular interval around the hub 25. The ribs 29B formed on a rear surface of the web 28 are arranged in a same way as the ribs 29A. Each of the ribs 29A and 29B is symmetrically disposed at both the front and rear surfaces of the web 28. As a result, a perpendicular cross section of the web 28 intersects the cross sections of both the ribs 29A and 29B as illustrated in FIG. 7. Since a partial shrinkage phenomenon occurs at each of portions of the plastic gear 14 where the ribs 28A and 29B are disposed at same angular positions on the front and rear side surfaces of the web 28, during a cooling process of molding, diameters of these portions decrease to be less than that of other portions.

When producing a gear made of a metal by cutting a metal material, such a partial shrinkage phenomenon, of course, does not occur. Such a partial shrinkage phenomenon may occur only in a case that a pair of ribs 28A and 29B are disposed at same angular positions on the front and rear side surfaces of the web 28. The eccentricity of a gear periphery of the conventional plastic gear that includes a pair of six pairs of ribs 29A and 29B respectively formed on the front and rear side surfaces 28A and 28B of the web 28 is illustrated in FIG. 14. As there shown, the diameter of the gear edge circle remarkably changes six times corresponding to the number of the ribs. As a result, the rotational speed of the plastic gear varies six times; thereby unevenness of the rotation speed arises when the conventional plastic gear rotates.

A possible cause of the change in rotational speed of the plastic gear is explained below. A portion of the gear ring 27 and gear teeth 26A, 26B and 26C each mounted on the circumference of the gear ring 27 are typically illustrated in FIG. 15. As there shown, ends of the ribs 29A and 29B are connected to the same portion (shown enlarged for ease of illustration) of the gear ring 27 between the tooth 26B and 26C. A space between the teeth 26B and 26C is illustrated larger than actual for an explaining purpose.

The portion of the gear ring 27 between the teeth 26B and 26C is more indented toward a rotational center of the plastic gear than other portions thereof, since the partial shrink occurs when the plastic gear is molded. Thus, the tooth 29A positioning at a left side of the ribs 29A and 29B inclines on the right and the tooth 29B positioning at a right side of the ribs 29A and 29B inclines to the left as illustrated in FIG. 15.

A gear 26D meshes with the plastic gear 14 as illustrated in FIG. 15. If a pressure angle at a gear connecting portion at which a gear tooth 26D of another gear meshes with the gear tooth 26A is $\alpha_0$, a pressure angle $\alpha_1$, of the gear tooth 26B inclining to the right is larger than $\alpha_0$, A pressure angle $\alpha_2$ of the gear tooth 26C inclining on the left is smaller than $\alpha_0$.

If angular velocities are $\omega_0$, $\omega_1$, and $\omega_2$ correspond to gear portions having the angles of $\alpha_0$, $\alpha_1$, and $\alpha_2$.

The larger the pressure angle, the smaller the angular velocity and the smaller the pressure angle, the larger the angular velocity. Thus, the following relation is established around the ribs 29A and 29B.

$$\omega_1 < \omega_0 < \omega_2$$

Thus, when ribs 29A and 29B extend in a radial state, for example, from the rotational center of the gear and are each disposed in a same angular interval, a rotational speed of the gear periodically varies when the plastic gear rotates.

Further, a rotational speed of the conventional driving motor 10 generally varies once per one revolution thereof. Thus, a rotational velocity of the PC drum 1 remarkably changes at a prescribed timing, if a frequency of a change in rotational speed of the conventional driving motor 10 is substantially coincident with that of the plastic gear 14. This is because, cylindrical peaks due to the change in rotational speed of the driving motor 10 and that due to the plastic gear 14 coincide with each other. As a result, unevenness of a toner image (so called the jitter) arises on the surface of the PC drum 1, and the image quality is inferior.

For example, if the driving motor 10 rotates at 1,800 rpm, a frequency of a change in rotational speed is 30 Hz (obtained by dividing 1,800 rpm by 60 seconds). If the number of teeth of the output gear 13 of the driving motor 10 is ten, a number of teeth of a plastic gear 14 that meshes with the output gear is seventy, and a number of ribs 28A and 28B mounted on each of the surfaces of the web 28 of the plastic gear 14 is seven, a frequency of a change in rotational speed of the gear 14 becomes 30 Hz, as is obtained by the following formula.

1800 rpm×(10/70)×(1/60 sec)×7=30 Hz

Thus, if the peaks of the above-mentioned cycles accord with each other, the change in rotational speed of the PC drum 1 becomes remarkably large at a prescribed timing, since the change in rotational speed of the driving motor is added to that of the plastic gear 14. Thus, the above-mentioned plastic gear may not be used for the transmission device.

Further, a plastic gear may be produced using an injection molding method. In such a method, if a new plastic gear that has a larger or smaller number of ribs than the plastic gear previously used is to be molded using the same mold, the mold is required to be remodeled to produce a different number of the ribs. However, it generally is expensive to remodel the mold that has produced the previous model of the plastic gear, for example, by changing a plastic injection gate, through which molten plastic is poured.

Further, after a plastic gear is molded, it is ejected from the mold generally using a prescribed number of ejecting pins by the following manner.

As illustrated in FIG. 19, the prescribed number of ejecting pins is inserted into guiding holes provided in a core respectively. When the molding is completed, the gate and cavity are separated from the core as illustrated in FIG. 20, and the prescribed number of ejecting pins then automatically push the plastic gear out to eject the plastic gear from the core.

During ejection of the plastic gear, a great amount of resistance is generally generated due to thrusting conflict between a surface of the plastic gear and a gear-cutting portion of the core as noted from FIG. 21. To overcome the great amount of resistance, a prescribed amount of pressure generally is applied to the plastic gear via the plurality of ejecting pins. Thus, the plurality of pins generally have relatively large diameters respectively to cooperatively apply the prescribed amount of pressure. In such a case, each of the plurality of ejecting pins is preferably arranged to contact the plastic gear with it leading end as being as close to the gear bottom as possible, as illustrated in FIG. 22, in order to minimize shearing force to be generated between the pressure and the resistance in the plastic gear as much as possible. To this end, a prescribed plurality of portions of the section of the gear bottom generally are molded to be fat, as illustrated in FIGS. 23A and 23B, and the plurality of ejecting pins contacts the fat sections directly or via a prescribed base plate.

However, such fat section might effect partial shrinks in gear teeth locating at the back side of the fat portion after the molding, thereby resulting in unevenness of radius diameter and rotational speed. This causes a problem such as jitter, for example, in a half tone image when such a plastic gear is utilized as a part of transmission for transmitting a driving force to an image carrier on which an image is formed.

SUMMARY OF THE INVENTION

Accordingly, an object of the present invention is to address and resolve the above identified and other problems.

Another object of the present invention is to provide a new plastic gear molding system including a mold having a prescribed gear shape and a gear bottom of constant thickness, and a cutting device for cutting a prescribed number of substantially radial grooves in the mold. A prescribed number of gates may be provided for pouring molten plastic into the mold. In addition, a prescribed number of pins having a diameter smaller than the thickness of the gear bottom may be provided for ejecting the gear from the mold.

In yet another embodiment, the prescribed number of pins may have substantially the same diameter and said prescribed number is determined as is in a reverse ratio to duplication of the radius of each of the pins.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 20B is a cross sectional view illustrating the background mold separating process when both of the gate and a cavity are separated from the gear;

FIG. 22 is cross sectional views illustrating relations between pressure applied by the ejecting pin and resistance produced during the separation of the gear along the gear teeth;

DETAILED DESCRIPTION OF THE PREFERRED EMBODIMENTS

Figure 1:
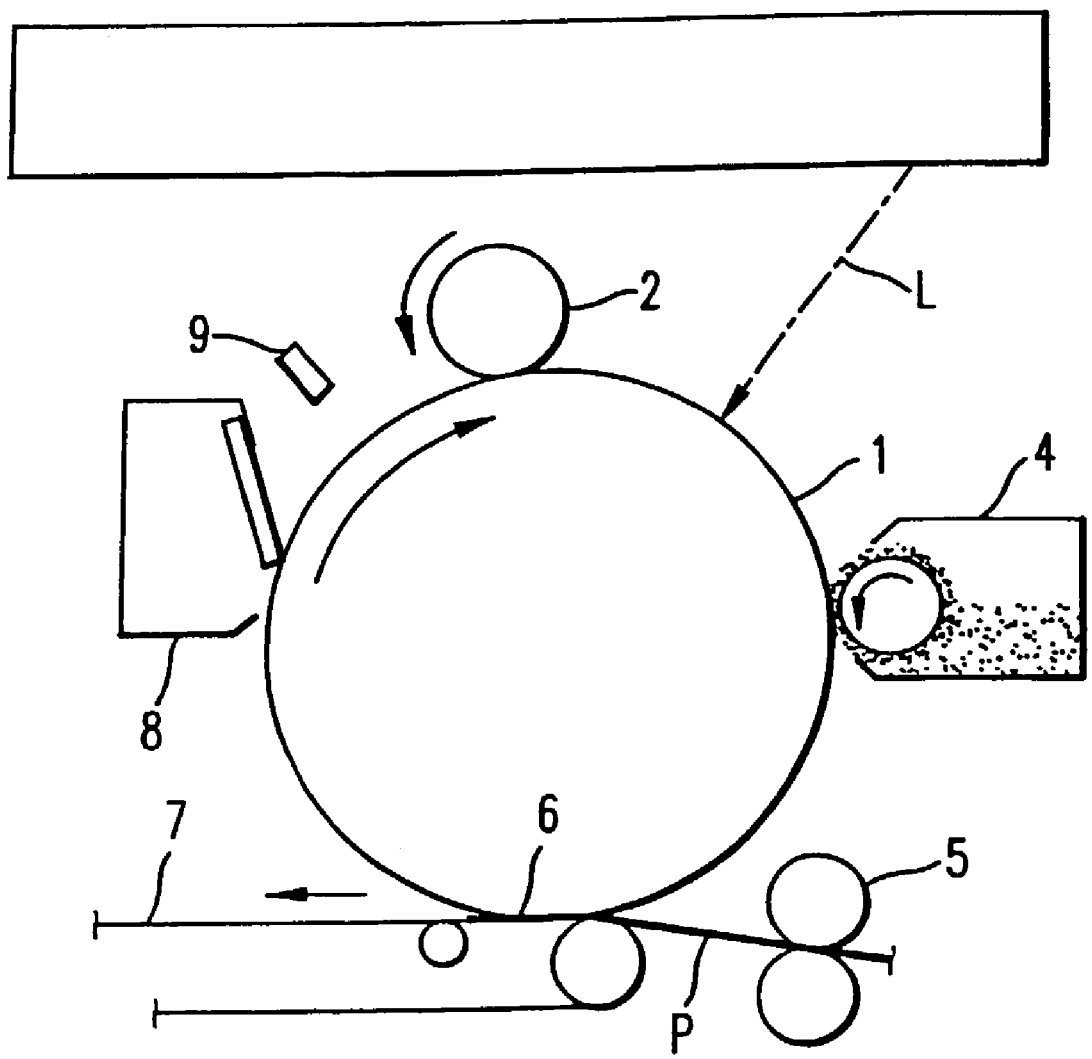
FIG. 1 is a schematic sectional view illustrating an image forming apparatus to which a plastic gear of one embodiment of the present invention is to be applied.

Hereinbelow, embodiments of the present invention is explained in detail referring to the drawings. Like numerical numbers and marks indicate identical or correspond parts throughout the drawings in several views.

An image forming apparatus to which a plastic gear of the present invention is to be applied is illustrated in FIG. 1. A laser printer is illustrated in FIG. 1 as one of example of the image forming apparatus. The laser printer includes a photoconductive drum 1 (hereinafter referred to as a PC drum 1) supported by a frame of the laser printer body to freely rotate, which is driven in a clockwise direction by a transmission device explained later in detail. A discharge roller 2 is disposed in contact with a surface of the PC drum 1, which rotates counter clockwise and applies a charge having a prescribed polarity to the surface thereof.

An optical writing device 3 is provided so as to generate a laser light beam L.

The laser light beam is then optically modulated and then radiated to the surface of the PC drum 1, thereby forming a prescribed latent image thereon. A developing apparatus 4 is provided so as to develop the latent image when it passes through the developing station.

A sheet cassette, not shown, accommodates a plurality of printing sheets P. The printing sheet P fed from the cassette is transferred to a transfer station 6 to receive a toner image at the position. A transfer belt 7 disposed below the PC drum 1 in pressure contact with the surface of the PC drum 1 at the transfer position. The transfer belt 7 is rotated in a predetermined direction. An electric field is created between the transfer belt and the PC drum 1 at the transfer position so that a transfer bias voltage that renders enables toner transfer is applied therebetween. Thus, the toner image on the surface of the PC drum 1 is transferred onto the printing sheet due to the bias voltage.

A fixing device, not shown, is provided downstream of the transfer station. The toner on the printing sheet P is permanently fixed on the printing sheet P by the fixing device when it passes through the same.

The printing sheet P is then ejected to the outside of the image forming apparatus and stacked on a sheet receiving tray, not shown. A cleaning device 8 is employed so as to clean the surface of the PC drum 1 by removing a residual toner remaining on the surface thereof after the toner transfer is completed. A discharge lamp may be provided so as to discharge the surface using a light beam.

Figure 2:
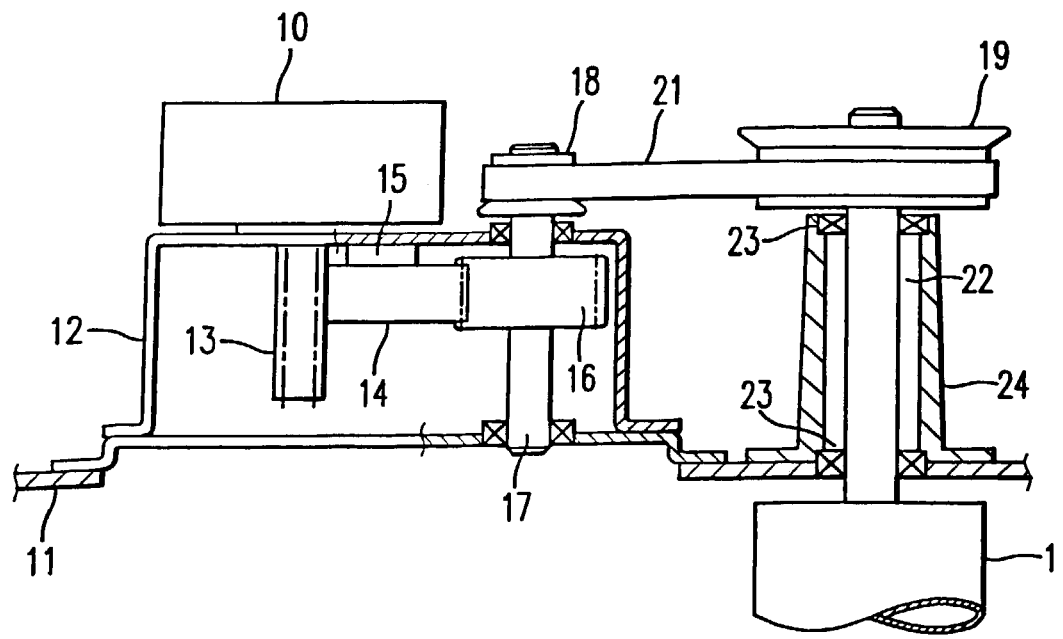
FIG. 2 is a plan view, including a partial cross sectional view, illustrating a transmission device of the image forming apparatus illustrated in FIG. 1, which employs a plastic gear.
Figure 3:
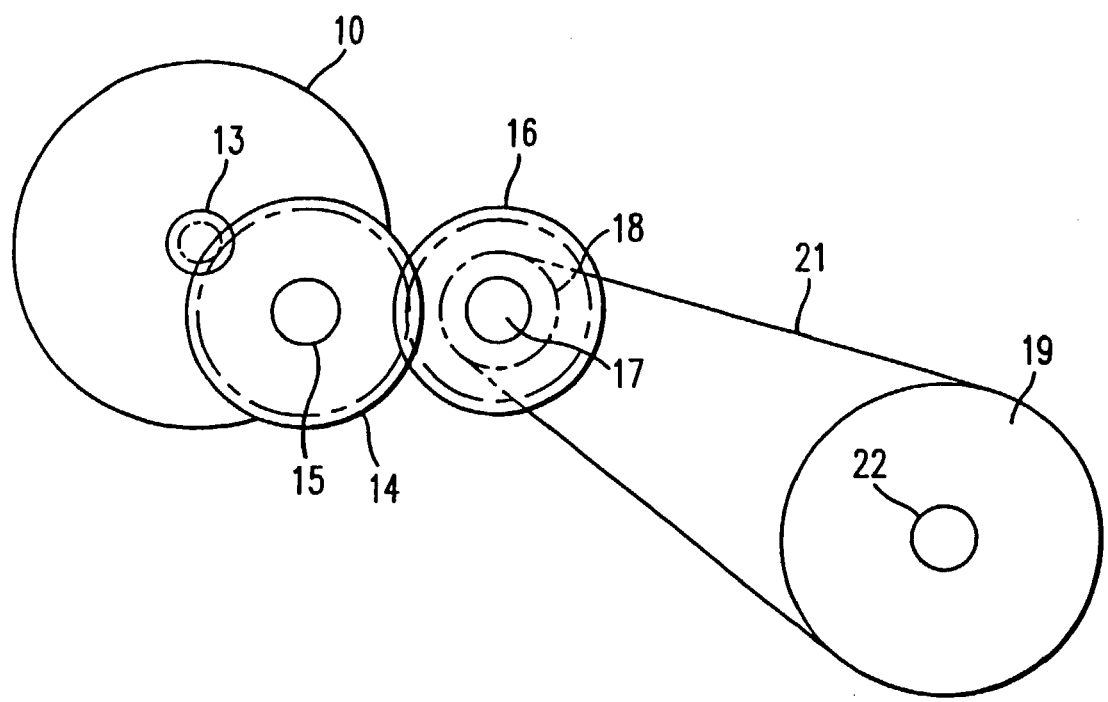
FIG. 3 is a front side view illustrating the transmission device illustrated in FIG. 2.
Figure 4:
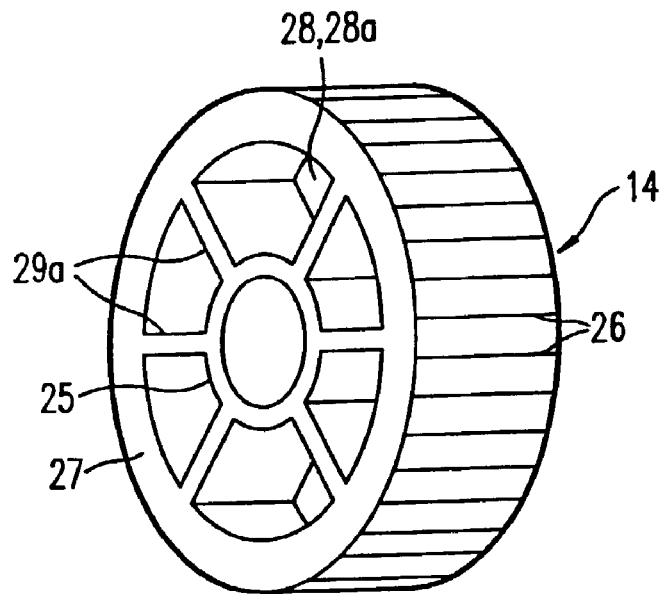
FIG. 4 is a perspective view illustrating one example of a plastic gear to be used in the transmission device illustrated in FIG. 3.
Figure 5:
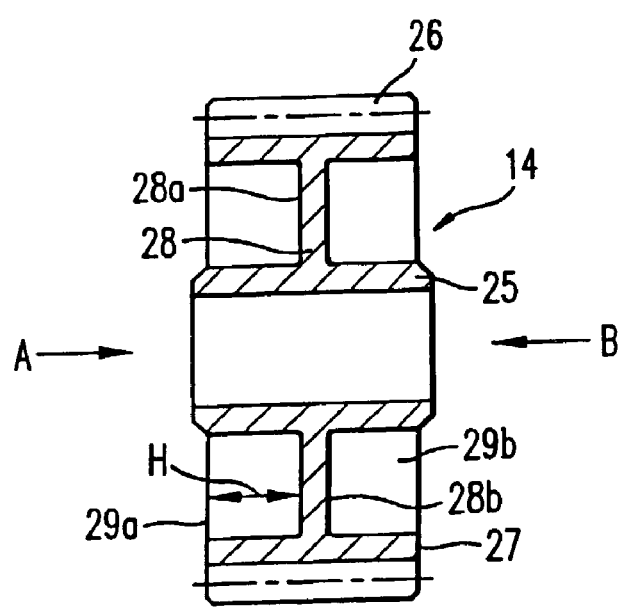
FIG. 5 is a vertical cross sectional view illustrating the plastic gear illustrated in FIG. 4.
Figure 6:
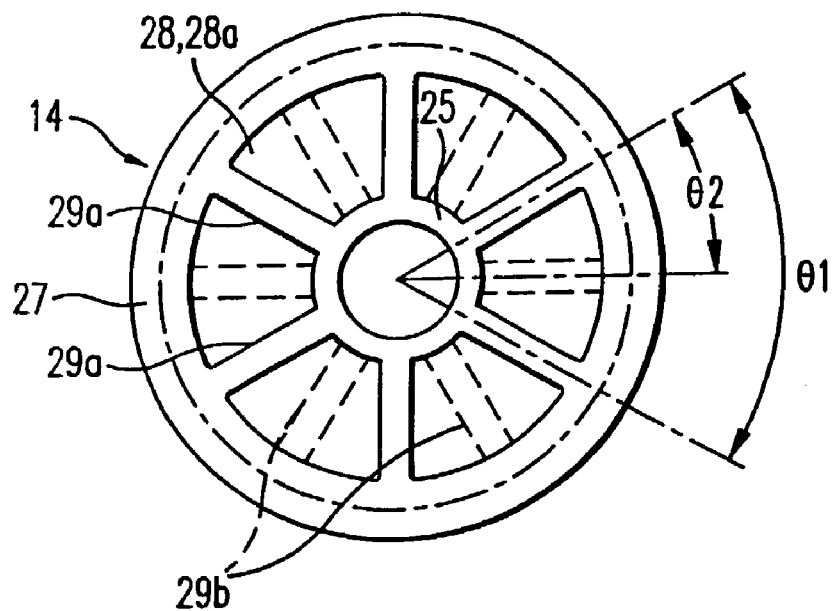
FIG. 6 is a front side view illustrating the plastic gear when viewed from a direction shown by an arrow A illustrated in FIG. 5.
Figure 7:
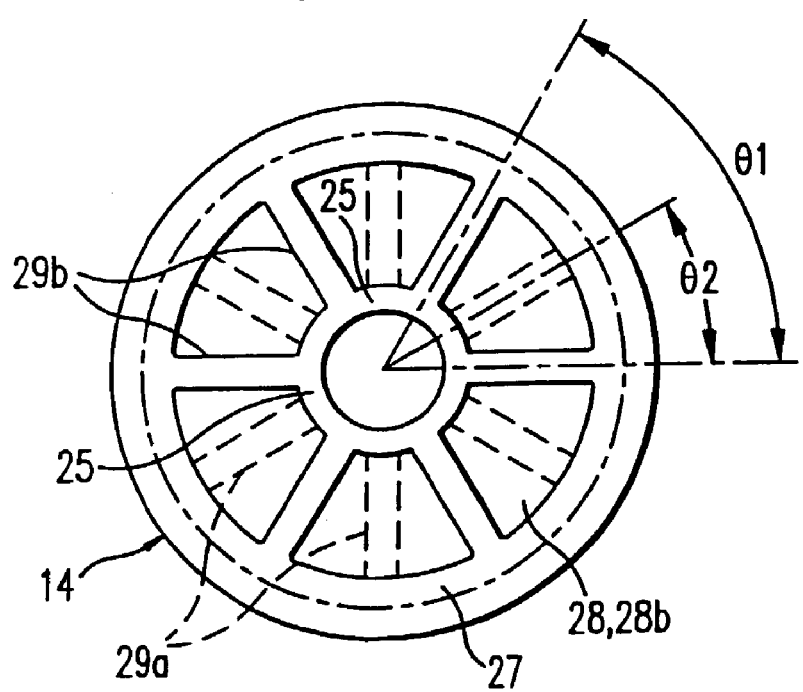
FIG. 7 is a front side view illustrating the plastic gear when viewed from a direction shown by an arrow B illustrated in FIG. 5.
Figure 8:
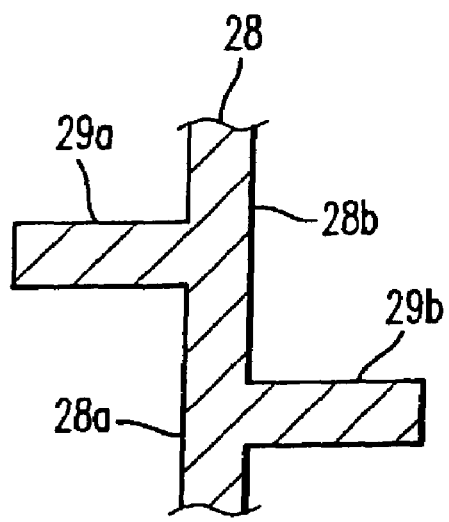
FIG. 8 is a cross sectional view illustrating a positional relation between a first rib formed on a front surface and a second rib formed on a rear surface of a web of the plastic gear illustrated in FIGS. 4 through 7.

One example of combinations of a driving motor 10 and a transmission device that transmits a rotational force from the driving motor 10 to the driven member is illustrated in partial sectional plan view in FIG. 2, and in a front view in FIG. 3. The driving motor 10 is fixedly supported on a bracket 12 secured by the frame 11. An output gear 13 is connected to an output shaft of the driving motor 10, with which meshes with a first gear 14 made of plastic. The first gear 14 is supported by a shaft 15 to freely rotate therearound, which is secured by the bracket 12. The first gear 14 meshes with a second gear 16 made of plastic. The second gear 16 is secured to a shaft 17 rotatably supported by the bracket 12 through a bearing. A timing pulley 18 concentric with the second gear 16 is secured to one end of the shaft 17. Another timing pulley 19 is secured to a supporting shaft that secures and supports the PC drum 1 therearound.

An endless timing belt 21 is wound around both the timing pulleys 18 and 19. The PC drum 1, the supporting shaft 22 and the timing pulley 19 are all concentric. An edge portion of the supporting shaft 22 is rotatably supported by a PC drum holder 24 that is secured to the frame 11 of the laser printer body. The frame 11 also rotatably supports another edge portion, not shown, of the supporting shaft 22.

When the driving motor 10 starts its rotation and accordingly the output gear 13 also rotates, a rotation force may be transmitted to the timing pulley 18 through the first and second gears 14 and 16. The rotation force is 15 precisely transmitted to the PC drum 1 through the timing belt 21, the timing pulley 19 and the supporting shaft 22, thereby rotating the PC drum 1 clockwise as seen in FIG. 1.

The output gear 13 may be made of a metal based upon standard S45C. Both the first and the second gear 14 and 16 may be molded articles made of plastic as mentioned earlier. The PC drum 1 may be a driven member that is driven by the driving motor through the gears 14 and 16. The transmission device may have one or more plastic gears.

Since each of the plastic gears 14 and 16 has a same constitution, the typical plastic gear 14 is hereinafter explained. As illustrated in FIGS. 4 through 7, the plastic gear 14 includes a cylindrical hub 25 disposed as a core portion and supported by the shaft 15 as illustrated in FIG. 2. The plastic gear 14 further includes an external gear ring 27 which is substantially concentric with the hub 24, has a larger diameter than the hub 24 and is disposed outside of the hub 25. The gear ring 27 includes a plurality of gear teeth 26 on its outer circumferential surface.

The plastic gear 14 further includes a web 28 constituted by a circular plate whose edges integrally connect the hub 24 with the gear ring 27. An injection type plastic molding device may used to mold the plastic gear 14 using plastic.

A plurality of ribs 28A and 28B are integrally formed respectively on front and rear sides of the web 28. A constitution of the plurality of ribs 28A and 28B are explained later in detail. The second gear is molded in the same manner as mentioned above.

Referring to FIGS. 4 through 7, each of rib groups 29A and 29B is formed on the sides of the web 28 in a manner such that each rib extends radially from the hub 25 toward the gear ring 27 at a prescribed angular interval around the hub 25.

Each of the ribs 29A is angularly shifted from each of the ribs 29B arranged on the back side of the web 28. Thus, ribs 29A and 29B are not symmetrically disposed on the side surfaces of the plastic gear 14.

FIGS. 4 through 7 show six ribs are formed each of the side surfaces of the web 28 of the plastic gear 14. Each of the angular spacings $\theta_1$, of the ribs 29A and 29B is therefore 60° (obtained by dividing 360 degrees by 6). Each of the ribs 29B formed on the rear side of the web 28 is located at a position that corresponds to a middle angular position between neighboring ribs 29A formed on the front side of the web 28. Thus, each of the ribs 29A is shifted by 30 degrees ($\theta_2$) from each of the ribs 29B. The number of ribs 29A and 29B can be optionally determined. At least one rib can be utilized on a surface of a web 28 for a purpose of increasing a rigidity of a plastic gear 14. If twelve ribs are employed, $\theta_1$, has 30 degrees and $\theta_2$ has 15 degrees.

Figure 13:
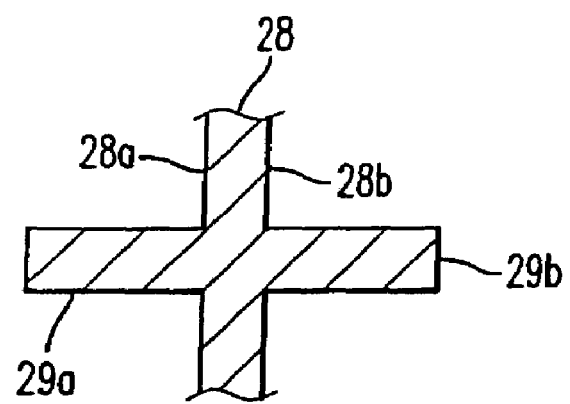
FIG. 13 is a cross sectional view that illustrates a positional relation between a first rib formed on the front surface and a second rib formed on the rear surface of a web of the conventional plastic gear illustrated in FIGS. 10 through 12.
Figure 14:
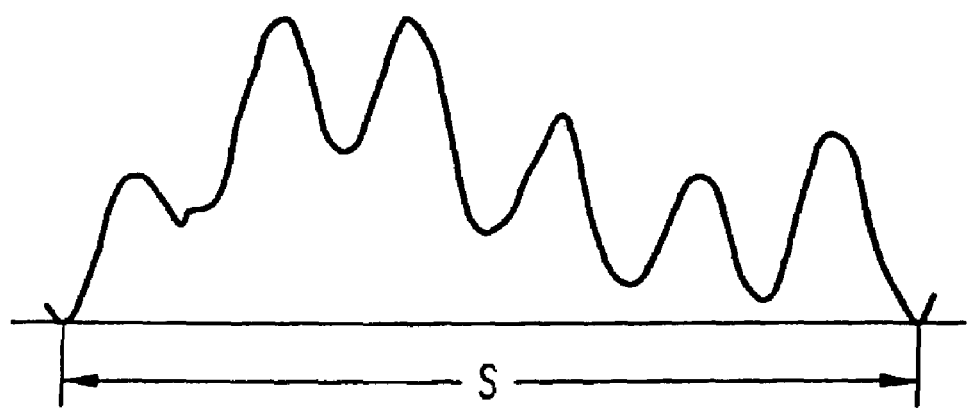
FIG. 14 is a graph showing a result of a meshing test executed using an eccentric condition of the conventional plastic gear during one revolution thereof.
Figure 15:
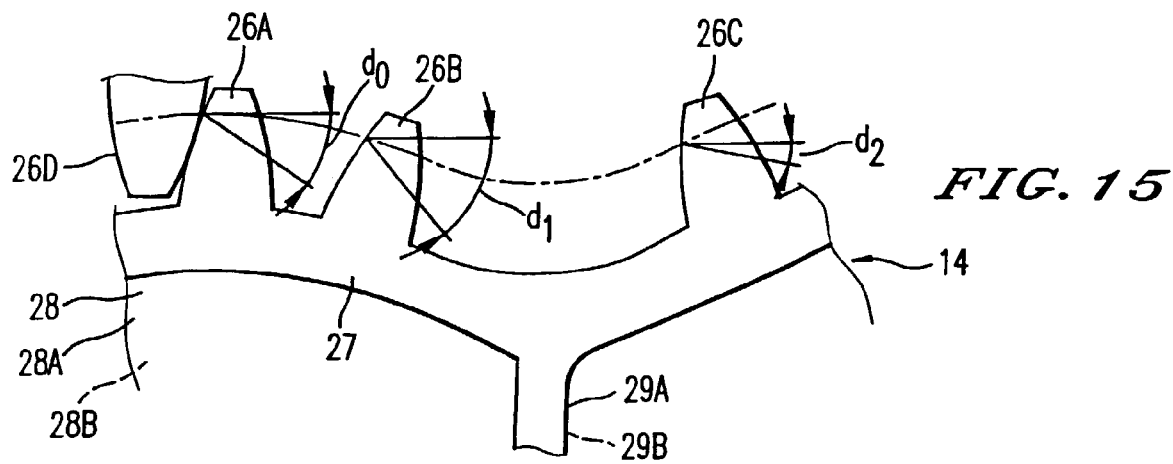
FIG. 15 is a partial cross sectional view illustrating the conventional plastic gear, which explains a problem of the conventional plastic gear.

Thus, as illustrated in FIG. 13, the section through the web 28 does not intersects the sections of both the ribs 29A and 29B, since the ribs 29A and 29B are shifted by a prescribed angle in a rotational direction of the plastic gear 14. The section of the web 28 and a section of one of the webs 28A and 28B intersect each other to form substantially a T letter shape. Thus, a smaller amount of partial shrinkage occurs at portions of the web 28 in which only one rib is formed than at portions in which both the ribs 29A and 29B are symmetrically formed when the plastic gear 14 is molded.

As a result, the amount of a radial indentation of the gear ring 27 toward the rotational center of the plastic gear 14 may be reduced, and accordingly a decrease in diameter of portions in which the rib is formed may be also suppressed. Thus, the diameter of the plastic gear 14 of the present invention illustrated in FIGS. 4 through 7 is more even than that of the plastic gear 14 illustrated in FIGS. 10 through 12.

Figure 10:
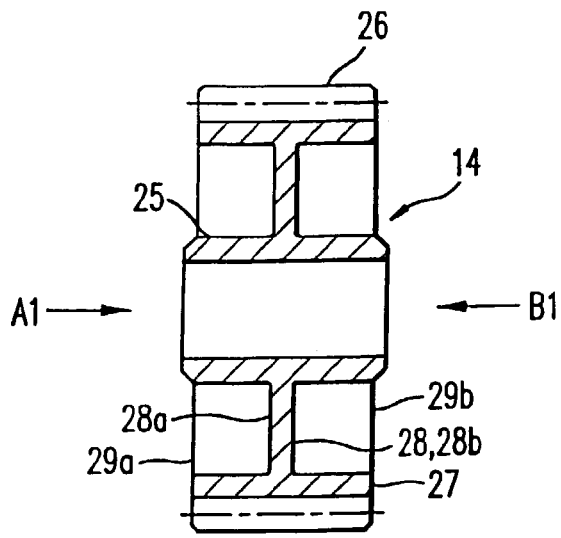
FIG. 10 is a vertical cross sectional view illustrating a plastic gear having a plurality of ribs symmetrically formed on front and rear surfaces of a web of a conventional plastic gear.
Figure 11:
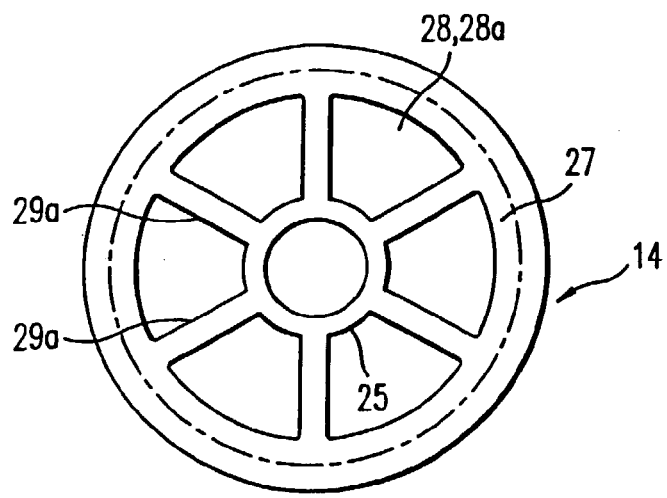
FIG. 11 is a front side view illustrating the conventional plastic gear when viewed from a direction shown by an arrow Al as illustrated in FIG. 10.
Figure 12:
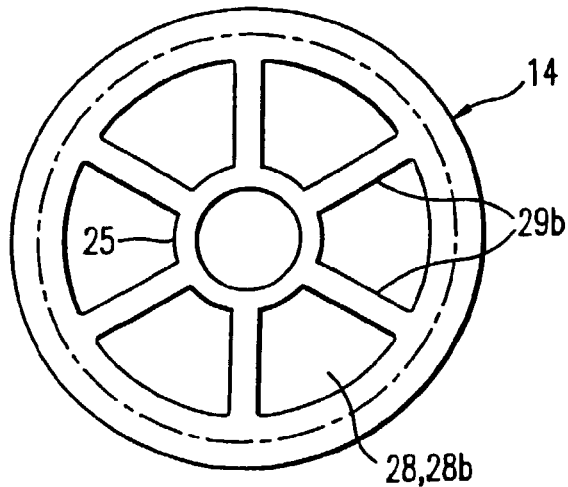
FIG. 12 is a rear side view illustrating the conventional plastic gear when viewed from a direction shown by an arrow B1 as illustrated in FIG. 10.

Since each of the ribs 29A is shifted from each of the ribs 29B by an angle of 30° in a rotational direction of the plastic gear 14 as illustrated in FIGS. 4 through 7, a frequency of a change in rotational speed of the plastic gear 14 when it is rotated may be two times of that of the plastic gear 14 as illustrated in FIGS. 10 through 12, even if the same number of ribs is formed. Accordingly, an amount of change in rotational speed of the plastic gear 14 may be remarkably decreased.

Figure 9:
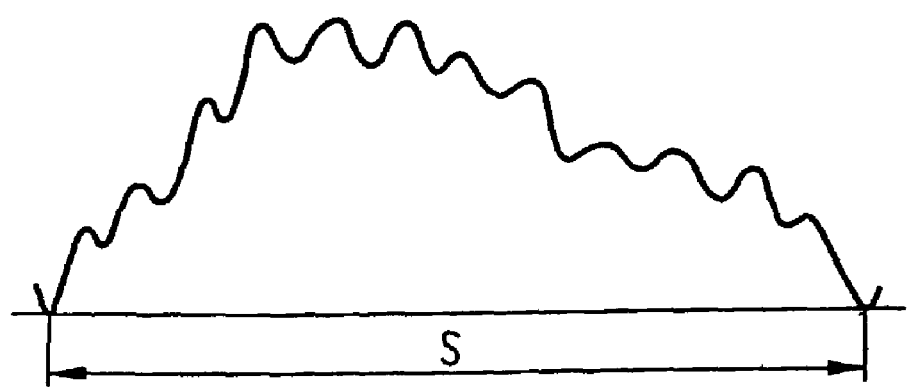
FIG. 9 is a graph showing a result of a meshing test executed using an eccentric condition of a plastic gear of the present invention during one revolution thereof.

A result of a meshing test in which the plastic gear 14 of the present invention is meshed with a conventional gear is illustrated in FIG. 9. As illustrated in FIG. 9, a change in rotational speed, which is caused by the partial shrinkage of the plastic gear 14 due to the indented of the portion of the gear ring 27, appears twelve times per revolution of the plastic gear 14. However, each of the twelve changes is relatively small. A gentle change in rotational speed appears one time during each revolution of the plastic gear 14 as illustrated in FIG. 9. However, it is not caused by molding of both the ribs 29A and 29B, but rather is an inherent result of the manufacturing of the plastic gear.

Since a plurality of ribs 29A and 29B is used on both sides of the web 28, respectively, in such a manner that each of the neighboring ribs creates a same angle $\theta_1$, and each of the ribs 29A is shifted by a half angle of $\theta_1$ from each of the ribs 29B, a stable rotation of the plastic gear 14 may be obtained with less of a change in rotational speed. This advantage may be ensured when the ribs 29A and 29B are elongated in a radial state from the hub 25 toward the gear ring 28. If the number of ribs increases, the below described advantages may be obtained.

The frequency of a change in rotational speed caused by a partial shrinkage of the ribs is increased, but uneven portions of the wave become smaller, and thereby the change in rotational speed is less noticeable. This advantage may be enhanced when the ribs formed on one side of the web 28 are shifted from that of another side.

Further, the wave frequency of the plastic gear of the present invention may be set much higher than a frequency of a change in rotational speed, for example, the latter frequency may be 30 Hz, based on the driving motor 10. Thus, a change in rotational speed of the PC drum 1 may be suppressed by avoiding a coincidence between each of the peaks and valleys of the cycles created by the shrinkage of the plastic gear 14, and variations in driving speed of the driving motor, respectively.

Figure 16:
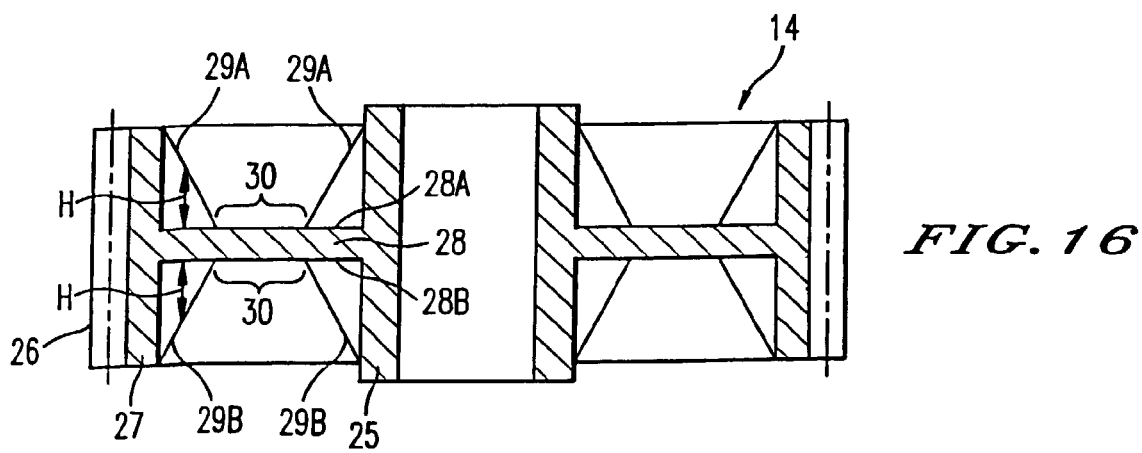
FIG. 16 is a cross sectional view illustrating another embodiment of a plastic gear of the present invention, which has a rib having a different height along a length thereof.

The ribs may have a same height from the surface of the web 28 along their lengths. However, a rib that has a different height along its length may be utilized. A slightly modified rib is hereinbelow explained in referring to FIG. 16. The height of the ribs may be higher around the hub portion and the gear ring portion, and lower, for example zero, at substantially a middle portion of the hub portion and the gear ring portion thereof.

A constitution of a plastic gear having the modified ribs may otherwise be same as mentioned earlier. These modified ribs may more efficiently avoid partial shrinkage than those previously described.

Figure 17:
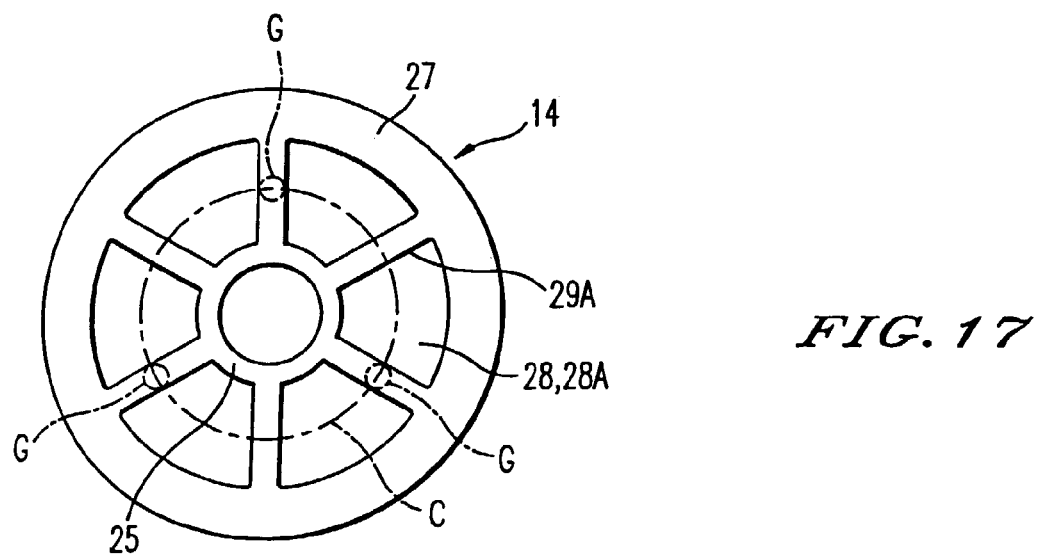
FIG. 17 is a chart illustrating a relation between a gate of a mold, through which molten plastic is poured into an inside of the mold, and a plastic gear to be molded.
Figure 18:
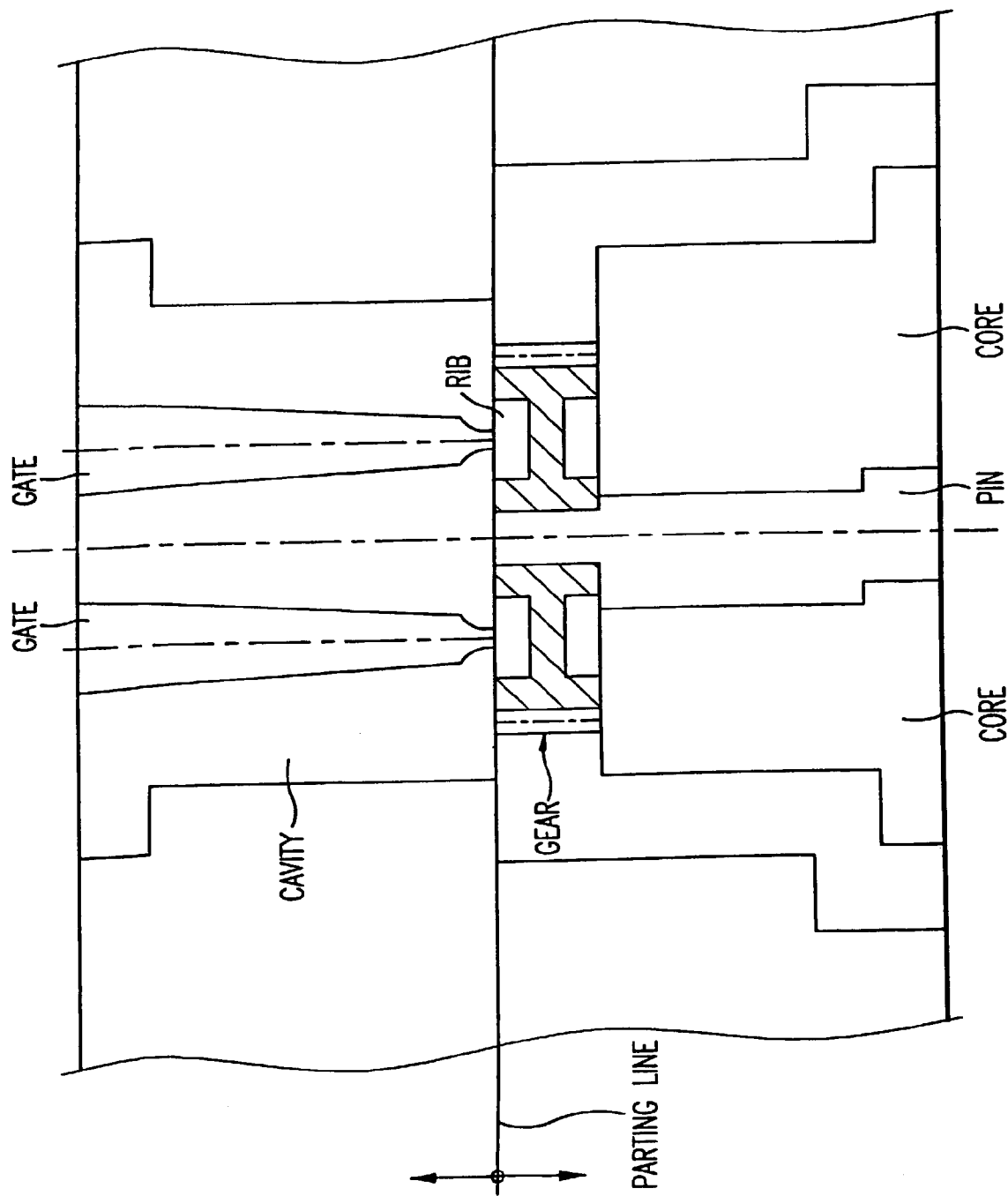
FIG. 18 is a cross sectional view illustrating one examples of molds used in the present invention.
Figure 19:
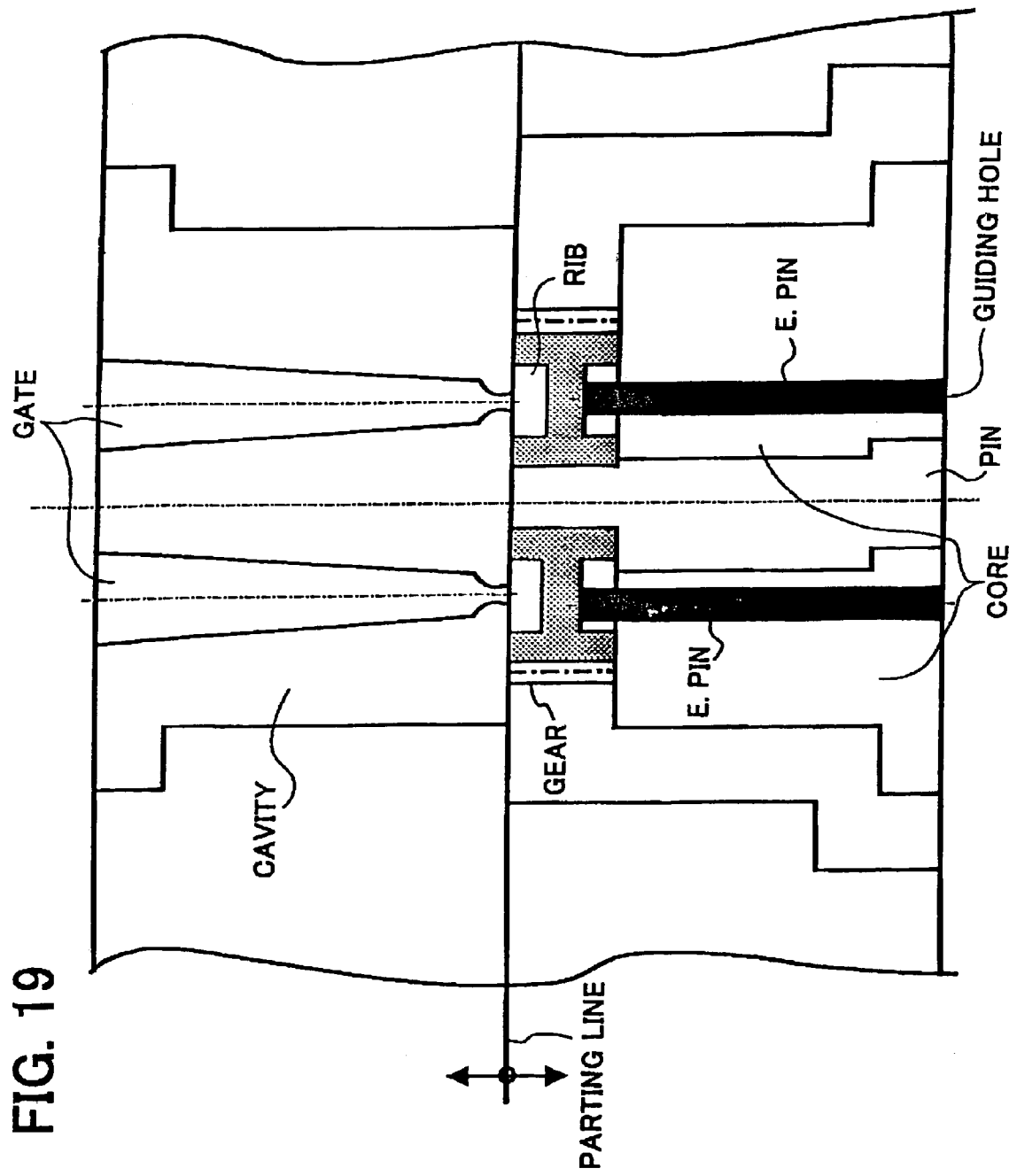
FIG. 19 is a cross sectional view illustrating a background mold gear ejecting process using an ejecting pin.
Figure 20A:
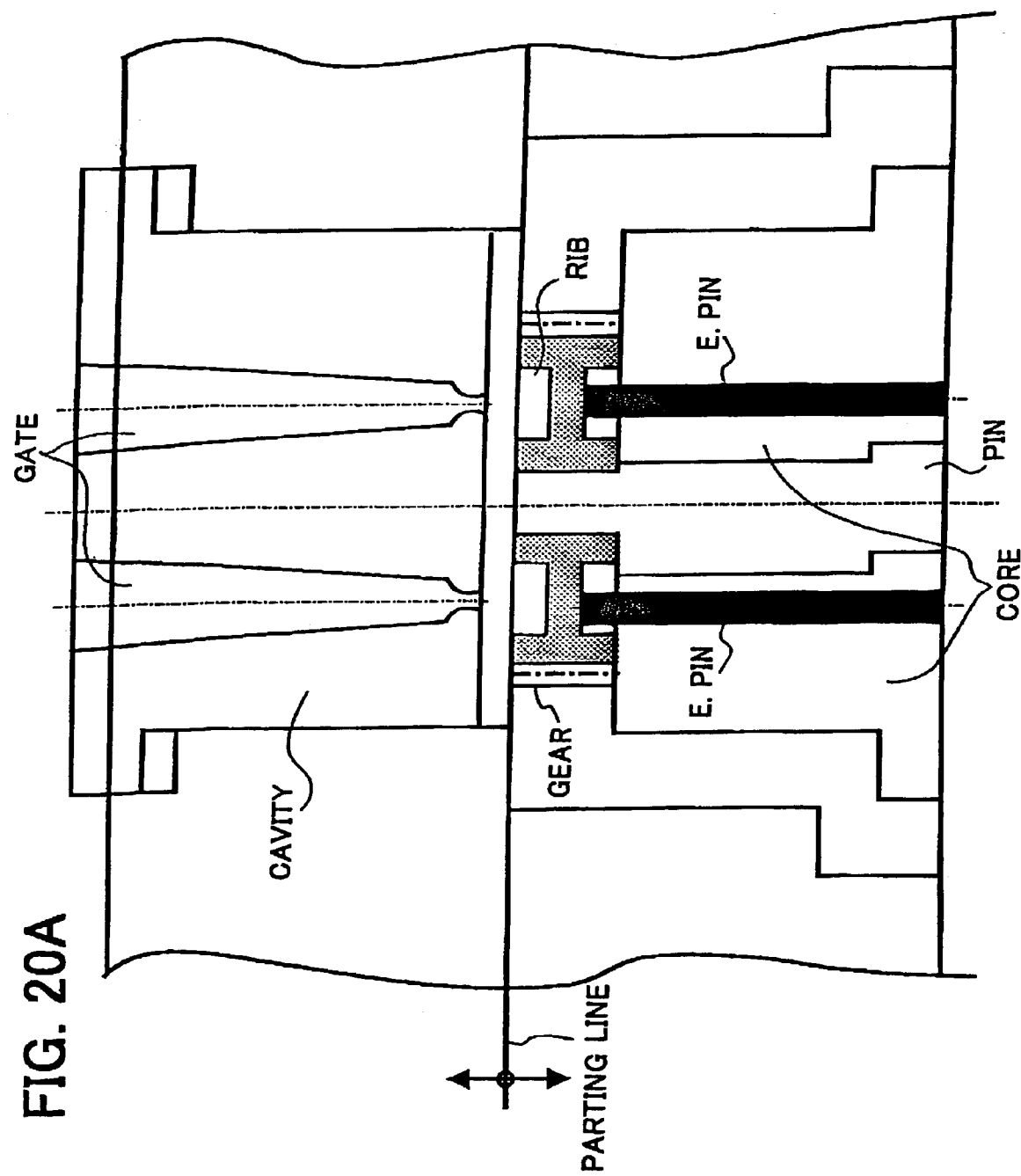
FIG. 20A is a cross sectional view illustrating the background mold separating process when a gate is separated from the gear.

Hereinbelow, another embodiment of the present invention is explained referring to FIGS. 17 and 18. Ribs 29A may be formed only on one side surface 28A of the web 28 of a plastic gear as illustrated in FIG. 17. Such a plastic gear 14 is generally molded by a mold illustrated in FIG. 18 using an injection molding method. A plurality, for example three, gates G having inlets may be employed at the same interval of an angle on a surface of the mold along a circle C illustrated by a dotted line in FIG. 17. A prescribed amount of molten plastic is generally poured into the mold through the gates G, thereby molding a plastic gear 14.

The number of ribs is preferably determined considering the above-mentioned problem when an image forming apparatus is designed. During developing the image forming apparatus, a frequency of a change in rotational speed of the PC drum 1 sometimes changes, since a flywheel or the like is added to a transmission device thereof. As a result, the number of the ribs 29A is sometimes required to be changed to avoid the problem of a coincident of the peaks and valleys as mentioned above, and accordingly, the mold is required to be modified. However, it may be costly if a gate G is changed when a number of ribs is increased, for example.

In this embodiment, a below described number of rib forming grooves that form a rib, which is provided in a portion of a cavity of the mold, is selectively used to minimize cost. When the number is to be determined, it is considered that each of the gates G is located on the circle C and above the rib-forming groove at a prescribed angle, and radially extending ribs are to be arranged at the same interval. If N is an integer more than two and represents a number of gates G, and n is an integer more than one, the number of the grooves to be provided is determined as:

$$N=2^{n-1}$$

After the number N is determined, the prescribed grooves are provided on the portion of the cavity at a prescribed interval by newly cutting grooves at each of middle angular positions of neighboring grooves previously cut. Since a number of ribs may be changed without changing gates G initially used by slightly modifying a portion of cavity of the mold, it is not costly.

For example, if three gates are used as illustrated in FIG. 17, and a number n is determined as two, a mold including six grooves is manufactured by newly cutting three grooves and using the previously cut three grooves to obtain a plastic gear 14 having six ribs 29A. A frequency of the thus molded plastic gear 14, when it rotates at 200 rpm, is:

$$200 \text{ rpm} \times 6 \text{ pieces} \div 60 \text{ sec} = 20 \text{ Hz}$$

When a frequency of a change in rotational speed of the PC drum 1, which is caused by the change in rotational speed of the driving motor 10, is changed from 30 Hz to 20 Hz due to a modification of the transmission device, since the frequency of the PC drum 1 is substantially coincident with a frequency caused by that of the ribs of the plastic gear 14, an amount of the change in rotational speed of the PC may increase.

The above-described integer n is then changed from two to three, to increase a number of ribs to twelve. Since a frequency of a change in rotational speed of thus molded gear 14 is obtained as 40 Hz (200 rpm×12 pieces÷60=40 Hz), it greatly differs from the frequency of 20 Hz in which the rotational speed of the PC drum 1 largely changes. Since only the integer n is changed with keeping the same number of gates G initially used, only a slight modification is made to the portion of the cavity of the mold, and a cost for a modification of the mold may be suppressed.

Further, if a rotational speed of a processing device such as a discharge roller 2 and a transfer belt 7 is changed, since the processing device contacts the surface of the PC drum 1, a rotational speed of the PC drum 1 accordingly changes and thereby generating an uneven toner image thereon.

Thus, if at least one plastic gear 14 or 16 is used as a transmission device that transmits a rotational force to the discharge roller 2 and the transfer belt 7, a change in rotational speed of both the discharge roller 2 and the transfer belt 7, and accordingly the PC drum 1, may be suppressed. Thereby, the quality of the toner image formed on the surface of the PC drum 1 may be improved. The above-mentioned plastic gear may be used at other locations besides the image forming apparatus.

Hereinbelow, one example of an ejecting operation for ejecting the above-described plastic gear from the mold will be explained with reference to FIGS. 25A and 25B.

Figure 25A:
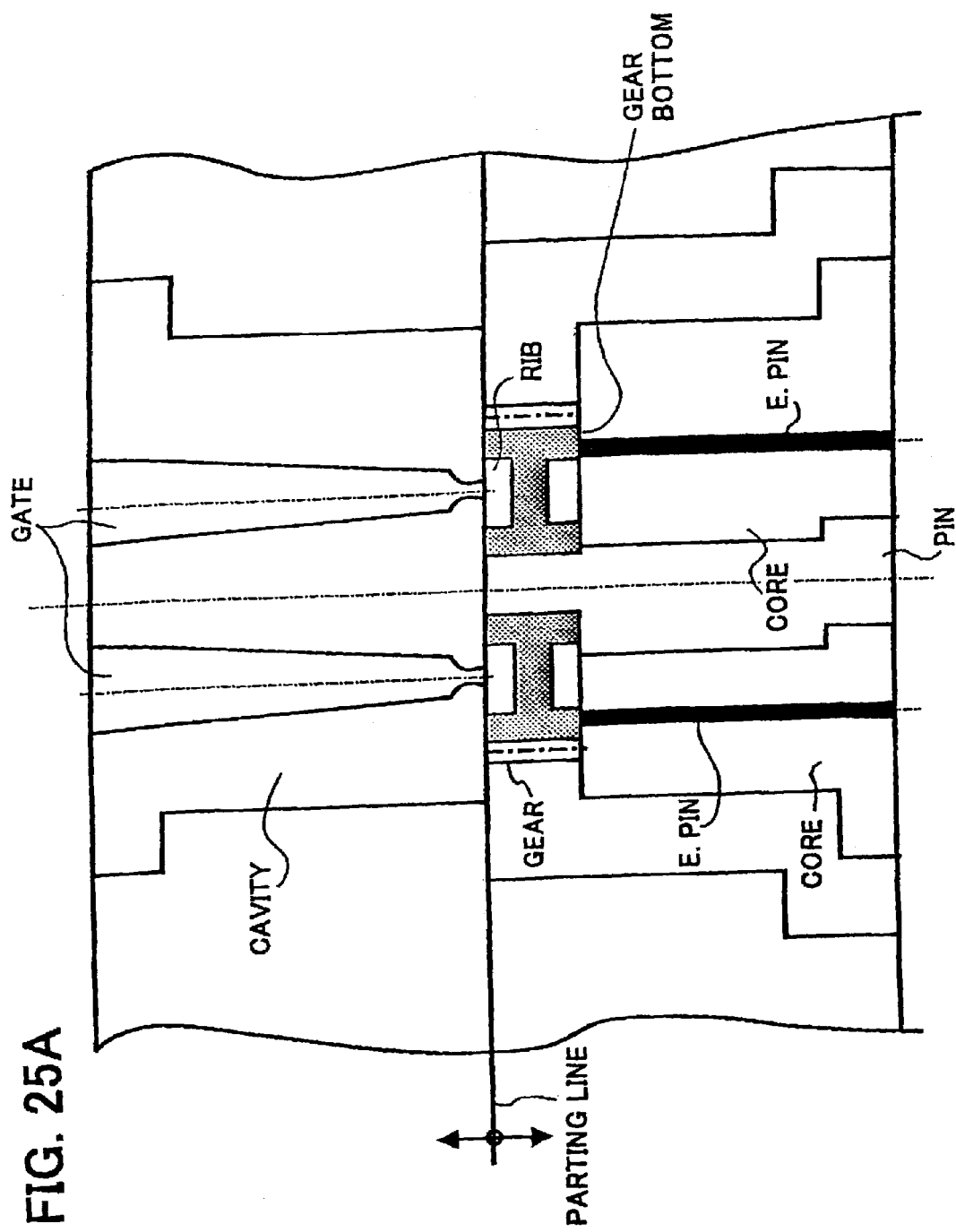
FIG. 25A is a schematic cross-sectional view of the molding system according to the present invention.
Figure 25B:
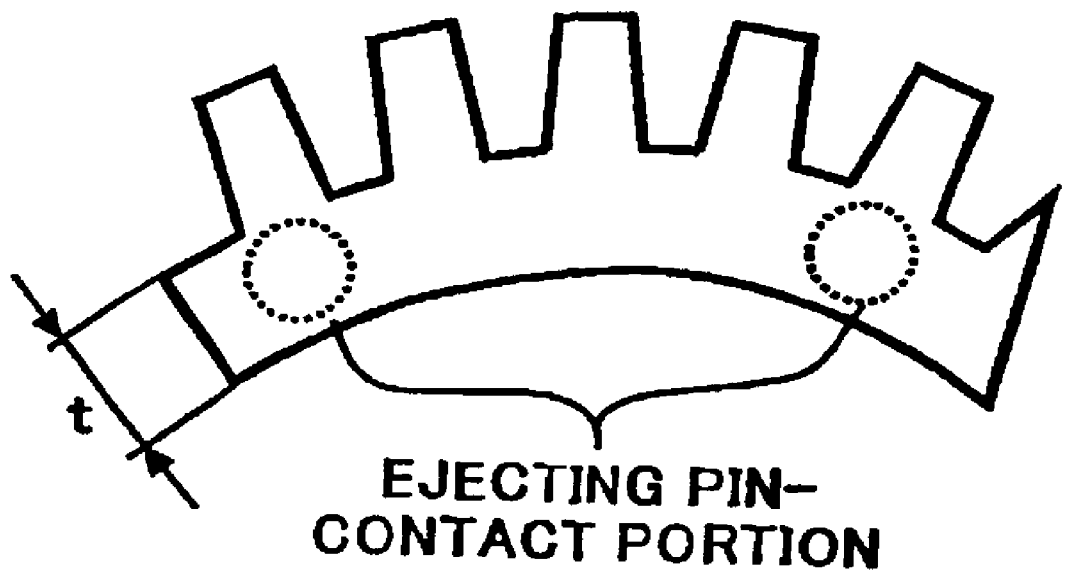
FIG. 25B is a schematic cross-sectional view of the gear bottom of the plastic gear molded in the molding system illustrated in FIG. 25A.

As illustrated in FIG. 25A, a core may include a plurality of core pieces separable along a rigid line.

The plurality of core pieces may respectively include a prescribed number of guiding holes for allowing ejecting pins respectively to reciprocate after the plastic gear is molded. The prescribed number of guiding holes may include both an inlet and outlet in prescribed core pieces. Each of the outlets (which are closed during molding) may have a prescribed width smaller than a thickness (i.e., a length of the side surface) of the gear bottom, and face the side surface. Accordingly, each of the ejecting pins may have a diameter less than the width of the guiding hole and the length of the side surface of the gear bottom.

As a result, the prescribed number of ejecting pins should be greater than that of the conventional ejecting pins. The number of electing pins to be utilized in this embodiment is determined as follows. For example, when the conventional molding method employs four items of the ejecting pins having diameters of 3 mm respectively, to apply the above-described prescribed pressure to the plastic gear including the gear bottom of 2 mm thickness at normal portions, the greater total pressure applying area is calculated by the following formula.

$$\pi \times 1.5^2 \times 4 = 28.3 \text{ mm}^2$$

Whereas in this embodiment, if diameters of 1 mm and 2 mm are utilized for ejecting pins respectively, the numbers of the electing pins (N) to be provided are calculated as follows.

| | |
|---|---|
| (N) × π × 0.5² = 28.3 | (N) = 36 |
| (N) × π × 1.0² = 28.3 | (N) = 9 |

Each of a prescribed number of pins has substantially the same diameter. The number of the ejecting pins to be utilized is determined by the diameter of the pin so that the total area in which the prescribed number of pins contact the gear is constant. Therefore, prescribed pressure required to overcome the thrusting resistance between the gear teeth and the gear cutting portion may be separately conveyed by the above-described numbers of ejecting pins to the side surface of the gear bottom having constant thickness (i.e., the gear bottom does not include fat sections). Thus, there exists less probability of partial shrinkage when such a plastic gear is molded and the above-described ejecting pins are utilized.

Figure 21:
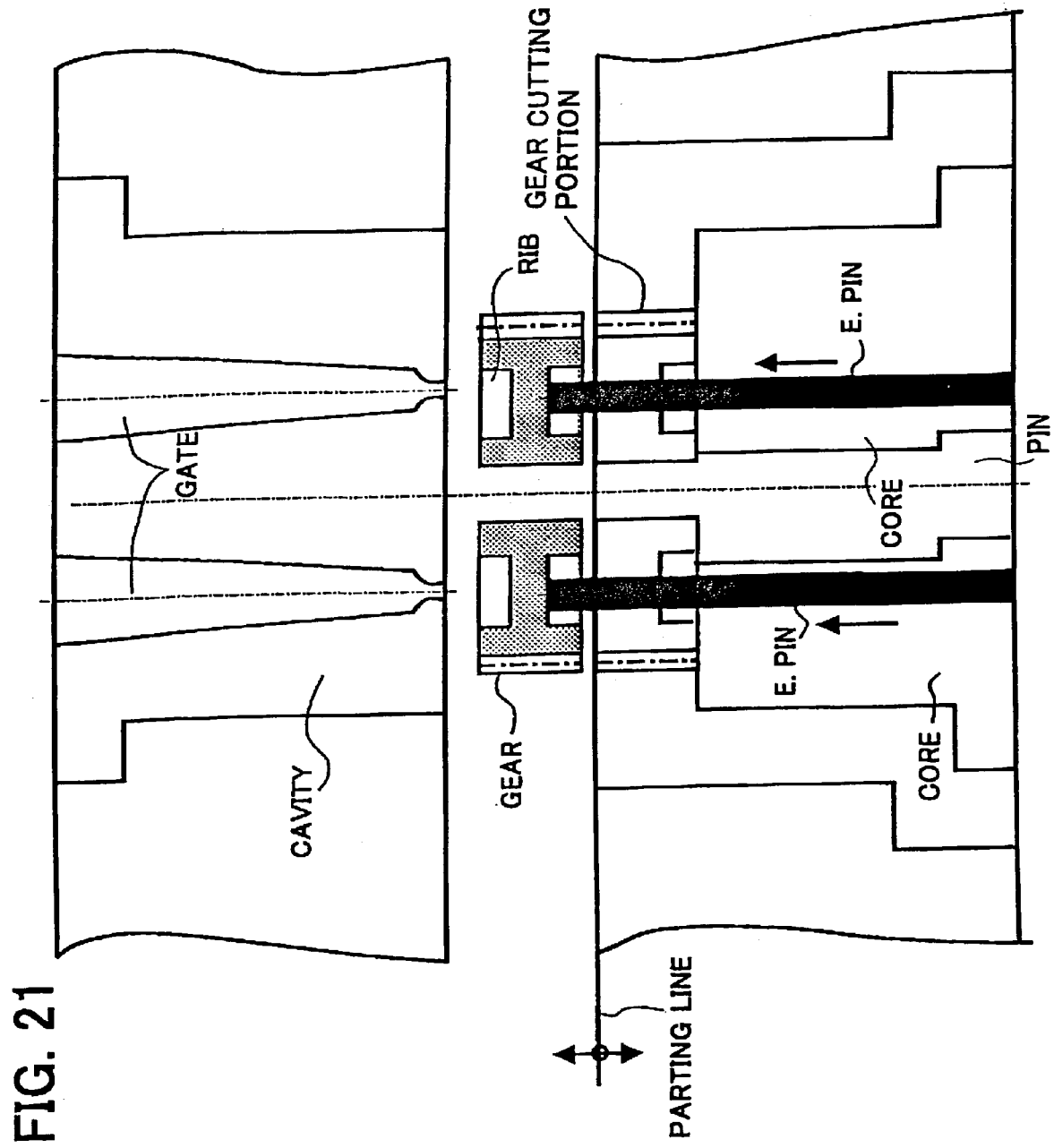
FIG. 21 is a cross sectional view illustrating the background mold separating process when the gear is separated from the mold.
Figure 23A:
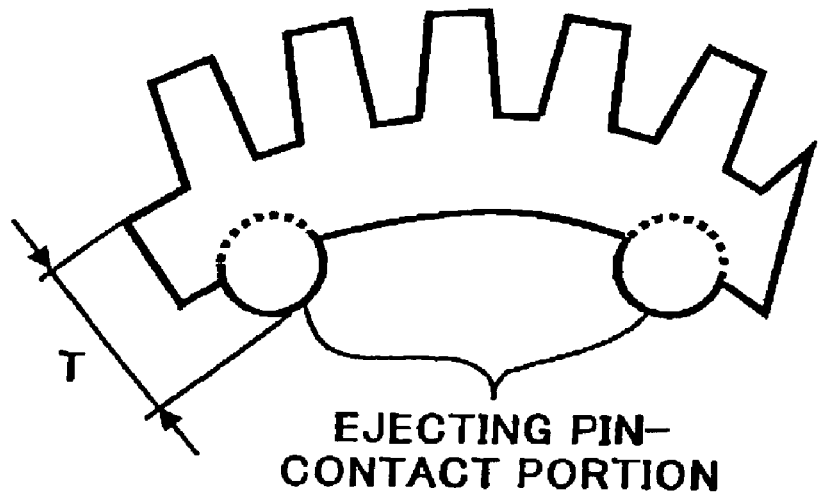
FIG. 23A is a martial sectional view illustrating a gear bottom having plurality of fat sections for engaging with leading ends of the ejecting pins, respectively.
Figure 23B:
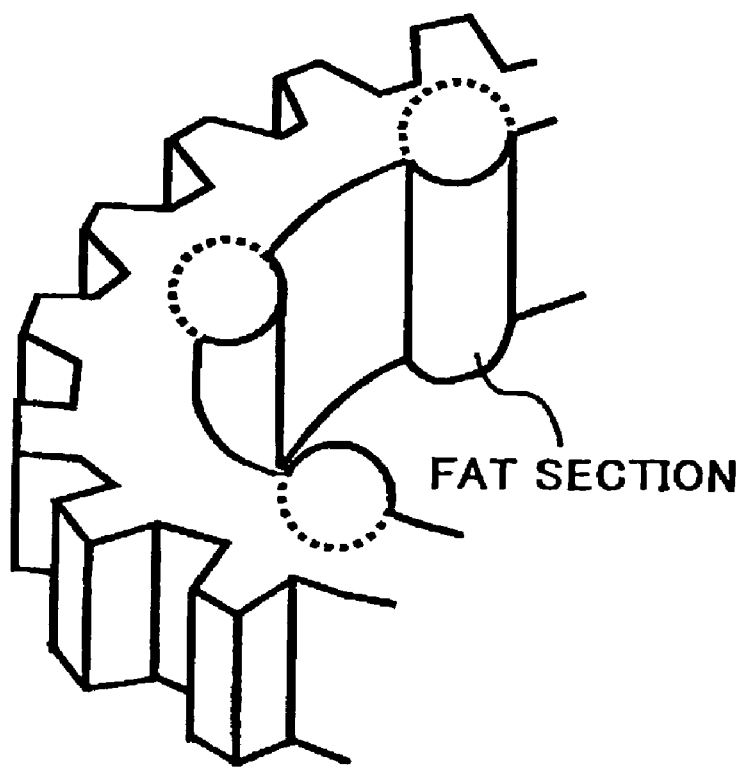
FIG. 23B is a schematic perspective view of the bottom illustrated in FIG. 23A.
Figure 23C:
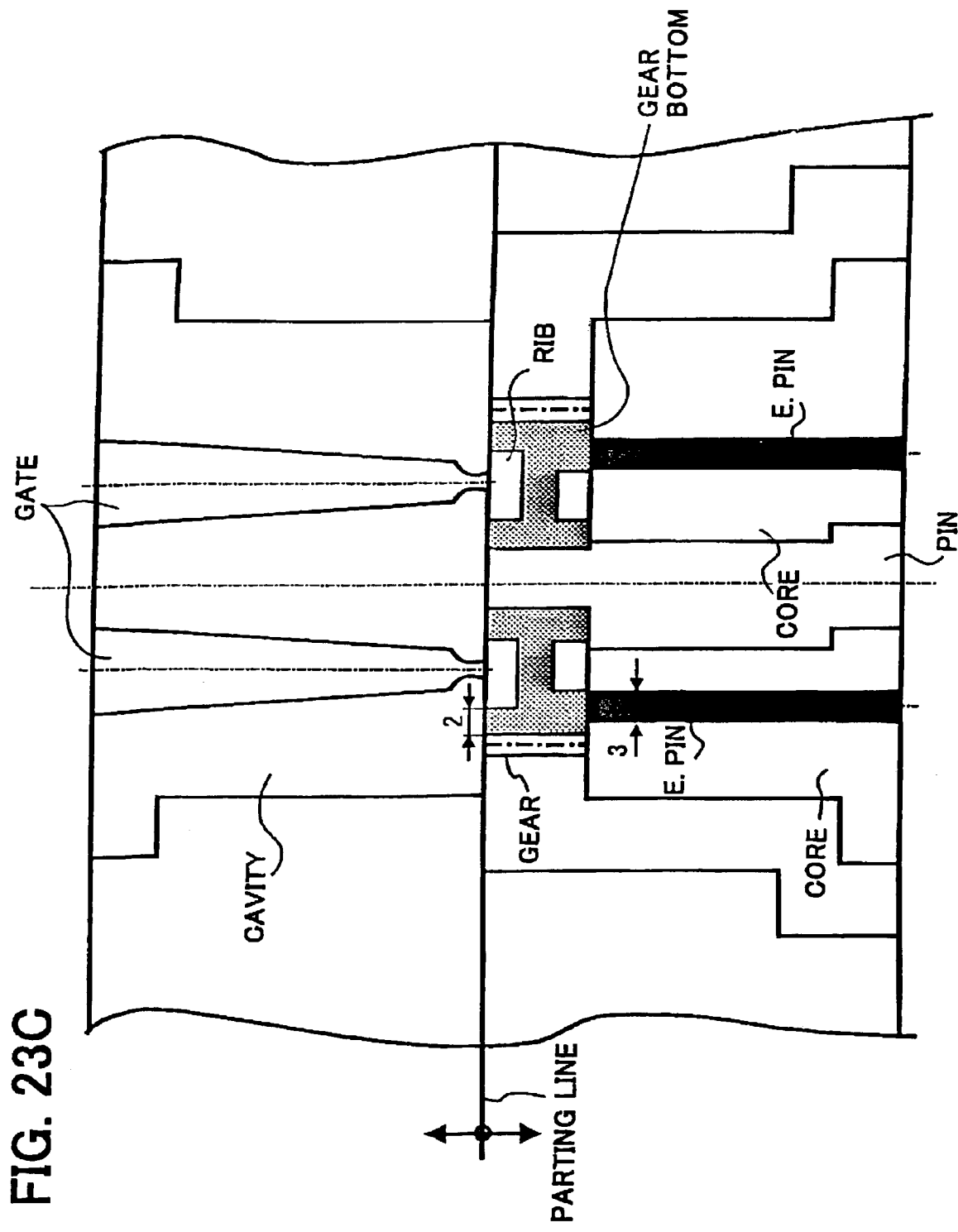
FIG. 23C is a sectional view illustrating the background molding system when a gear having the gear bottom illustrated in FIGS. 23A and 23B is molded and ejected.

One example of this embodiment of a plastic gear ejecting operation will be described with reference to FIG. 21. First the gate and then the cavity are separated from the parting line after a prescribed molding is completed. Then, for example, 16 pieces of the ejecting pins may be driven by a driver (not shown) to separately convey a prescribed amount of pressure required to collectively overcome the thrusting resistance. The 16 pieces of the ejecting pins may then contact the side face of the gear bottom having an entirely constant thickness, so as to push the plastic gear out. After the plastic gear is ejected from the cavity, the ejecting pins may return together with both the gate and cavity to their original positions to prepare for the subsequent molding.

Figure 24A:
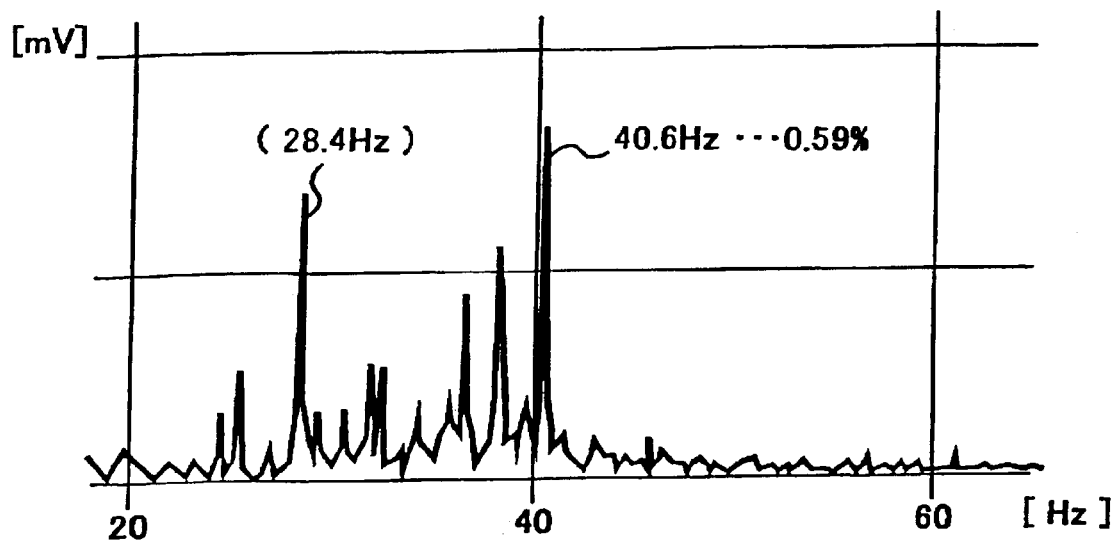
FIG. 24A is a graph showing unevenness of the rotational speed of the conventional plastic gear.
Figure 24B:
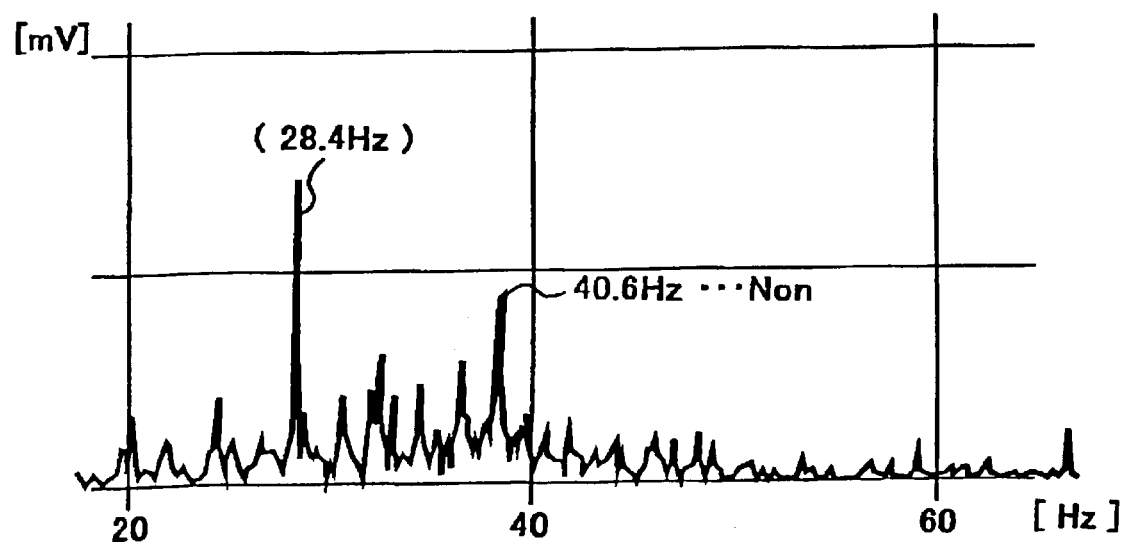
FIG. 24B is a graph showing improved unevenness of the rotational speed of the plastic gear according to the present invention.

According to the above described ejecting system, unevenness of rotation of the plastic gear can be efficiently suppressed when compared with the conventional plastic gear having fat sections in the gear bottom, whose rotational unevenness is as illustrated in FIGS. 24A and 24B. Specifically, as noted from FIG. 24B, the 40.6 Hz part, which is the larger unevenness amount, can be suppressed.

Obviously, numerous additional modifications and variations of the present invention are possible in light of the teachings. It is therefore to be understood that within the scope of the appended claims, the present invention may be practiced otherwise than as specifically described herein.

The invention claimed is:

1. A gear molding system, comprising:
   a mold configured to have a prescribed gear shape having a constant thickness in a gear bottom;
   a cutting device configured to cut a prescribed number of substantially radial grooves on the mold;
   a prescribed number of gates configured to pour molten plastic into the mold including the prescribed number of grooves; and
   a prescribed number of pins configured to eject the gear from the mold, each of said prescribed number of pins having a diameter smaller than the thickness of the gear bottom,
   wherein said prescribed number of pins have substantially the same diameter, and said prescribed number is determined as a reverse ratio to the square of the radius of each pin.

* * * * *